MECHANICAL MEMORY DEVICE USING FLEXIBLE MEMBERS

Filed June 11, 1965

2 Sheets-Sheet 1

INVENTOR
GERALD G. SILLS

BY [signature]
AGENT

Sept. 19, 1967 G. G. SILLS 3,342,968

MECHANICAL MEMORY DEVICE USING FLEXIBLE MEMBERS

Filed June 11, 1965 2 Sheets-Sheet 2

United States Patent Office 3,342,968

Patented Sept. 19, 1967

3,342,968

MECHANICAL MEMORY DEVICE USING FLEXIBLE MEMBERS

Gerald G. Sills, Van Nuys, Calif., assignor to Sperry Rand Corporation, New York, N.Y., a corporation of Delaware Filed June 11, 1965, Ser. No. 463,255

17 Claims. (Cl. 200—153)

The invention hereinafter described and claimed has to do with memory devices for storing bits of information for use in computers or the like. More particularly, the invention has to do with mechanical memory devices having bistable characteristics.

The important object of the invention is to provide an inexpensive memory device easily operable in response to momentary pressure.

A further object of the invention is to provide a mechanical memory device having bistable characteristics to maintain either a set or re-set, on or off condition.

Another object is to provide such a memory device which is suitable for a wide variety of applications.

In accordance with the above and first briefly described, the invention, in its preferred form, comprises a pair of elongated, flat, flexible, electrically conductive spring leaf members anchored at one end and extending toward each other with their free ends slightly overlapping and biased into contact with each other by their inherent resilience regardless of which member is overlapping the other. One member has an electrically insulating coating of suitable material, such as nylon, on one surface, to render it electrically non-conductive. Pressure on one member in a direction toward the other flexes it to an extent permitting it to snap to the other side of the other member and then to relax into contact therewith when the pressure is removed. With the conductive surfaces of the members in contact, the memory device is in its "set" or "on" condition. When the insulating surface is contacting the other member, the memory is in its "re-set" or "off" condition. Read out of the information in the memory device consists merely of determining which condition the two members are in, "set" or "re-set." This can be accomplished by contacting the members with electric probes, or by connecting the members with suitable signal detecting devices, such as a utilization or indicating device. If the device is in its "set" condition the probe or signal device will detect a closed circuit. However, if the insulated surface is in contact with the other member then the detector will show an open or non-conducting circuit. The members are stable in either condition requiring pressure on at least one to move from one state to the other.

Figures 1, 2, 3, 4, 5:
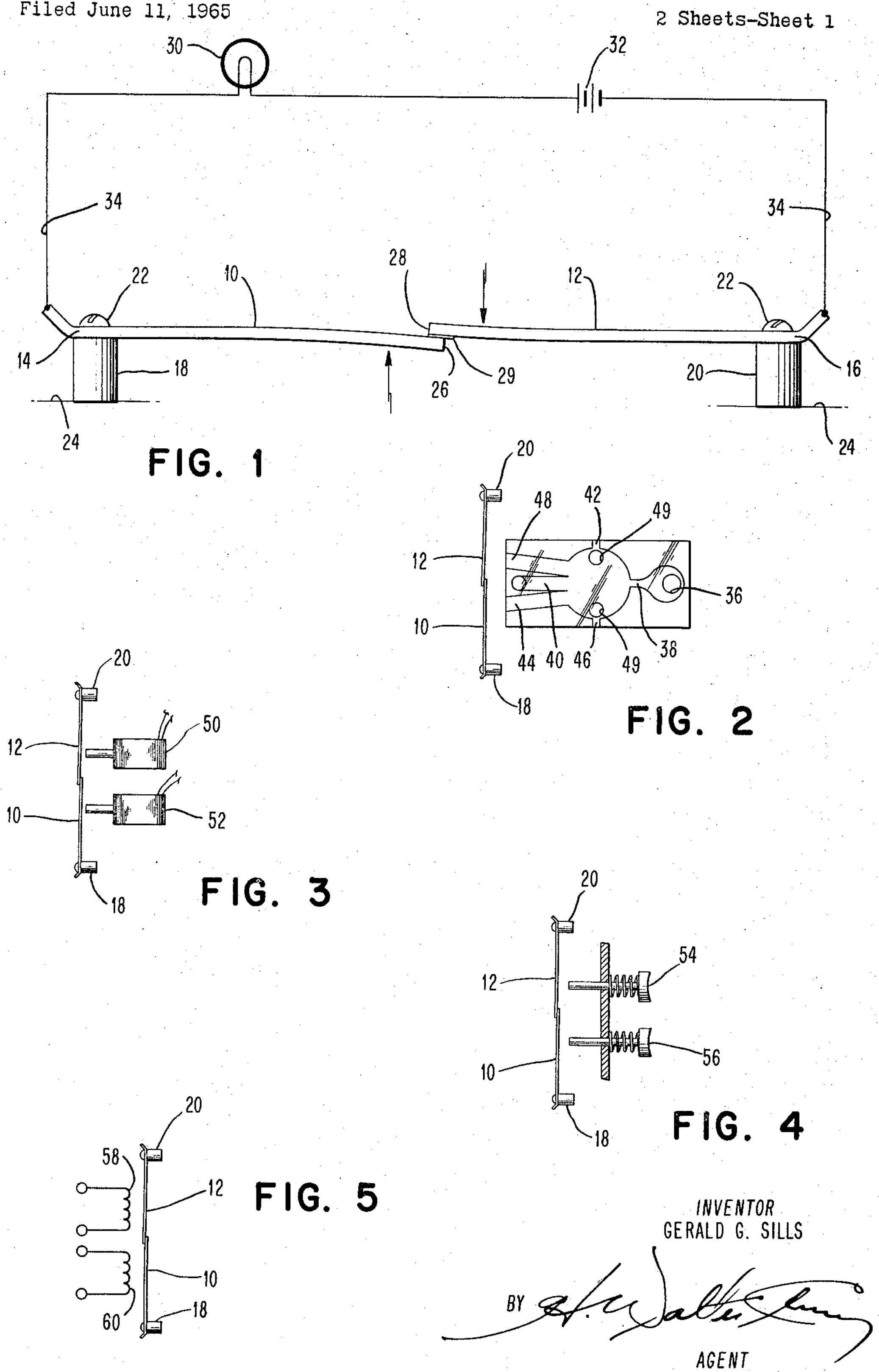
FIGURE 1 is an elevational view of a basic memory in accordance with the invention.
FIGURE 2 is a somewhat diagrammatic view showing the memory associated with a fluid actuating device.
FIGURE 3 is a view similar to FIGURE 2, but showing solenoid actuating devices.
FIGURE 4 is a view similar to FIGURE 2, but showing mechanical push button actuators.
FIGURE 5 is a view similar to FIGURE 2, but shows magnetic actuating devices.

Now with reference to the details of the drawings, and first to FIGURE 1, it is seen that the invention in its preferred form comprises a pair of elongated, flat, flexible, electrically conductive, spring leaf members 10 and 12 having opposite top and bottom surfaces (as shown) orthogonal to the direction of flexure. The outer ends 14 and 16 respectively of the members are anchored on base members, such as posts 18 and 20, both secured, as by screws 22, to a suitable support structure, generally indicated at 24. The members 10 and 12 extend toward each other in the same plane, but with their adjacent free inner ends 26 and 28 flexed out of the common plane and slightly overlapping in tight slidable engagement with each other by reason of their natural tendency and desire to realign themselves in the common plane. This is true regardless of which member is on top of the other.

Member 12 has at least an end portion of its under surface coated with a suitable electrically insulating material 29, such as nylon, to render it non-conductive. With the members 10 and 12 in the position shown, that is, with member 12 overlapping, or on top of member 10, they are in electrically non-conducting relationship, designated as the "re-set" or "off" condition of the memory device. To change to the "set" or "on" condition, wherein the members 10 and 12 are conductively associated, a force is exerted downwardly on member 12, or upwardly on member 10, as indicated by the arrows, causing them to flex until their ends slide, or retract to an extent permitting them to reverse their positions. The inner end 26 of member 10 will now be on top of the inner end 28 in conductive contact with member 12. To restore the memory to its original "off" condition, the above described operation is merely reversed.

The "set" or "re-set" condition of this memory device may be indicated or determined in a number of ways, one of which has been illustrated in FIGURE 1, by way of example. The screws 22, which are in conductive relationship with the members 10 and 12 are connected in circuit with a lamp 30 and a battery 32 through wires 34. With the members 10 and 12 in their conductive or "set" condition, as described above, lamp 30 will be "on," thus to indicate this condition. If the members are as shown in FIGURE 1, the lamp will be "off" to indicate the "re-set" condition. The lamp, of course, could be another type of operative device, such as a punch, if desired.

In FIGURES 2 through 5 it is seen that the memory device is adapted for operation by a number of different actuating means. In FIGURE 2, a fluid amplifier for operating the memory device is shown mounted adjacent the inner ends of the members 10 and 12. Fluid from the power source 36 normally is directed in a stream through the nozzle 38 into an outlet or dump channel 40 which directs the fluid stream in a direction away from the members 10 and 12 with no effect on them. To change the memory from its "reset" condition shown, to the "set" condition, a small jet of fluid is introduced through channel 42 to divert the fluid stream from channel 40 into channel 44 in accordance with well known fluid principles. The power stream is now directed against member 10 flexing it sufficiently for its end to snap, or spring past the inner end of member 12, thus to move it to the other side. When it reaches this condition the jet 42 is removed and the power stream returns to channel 40 and is dumped. Spring member 10 now relaxes into contact with member 12. To return the memory device to the condition shown, wherein member 12 is on top, a small jet of fluid is introduced through chnanel 46 to divert the fluid power stream into channel 48 and against member 12.

Fluid is provided to the power source 36 and the small channels 42 and 46 from a suitable source, not shown, but conventional, such as a pump. It will be understood that the shifting of the fluid from one channel to another is accomplished without "lock-on" of the fluid to any of the channel walls. Suitable relief ports 49 are provided to prevent this phenomenon.

Turning now to FIGURE 3, it is seen that the conditions of the elements 10 and 12 may be reversed in either direction by selective actuation of solenoids 50 and 52.

If desired, the memory device may be manually actuated by means of push buttons 54 and 56, as is seen in FIGURE 4.

FIGURE 5 illustrates the memory device with magnetic coil actuators 58 and 60 which when selectively energized by a direct current will induce an electromagnetic force in a direction to cause the members 10 and 12 to reverse their positions.

Figure 6:
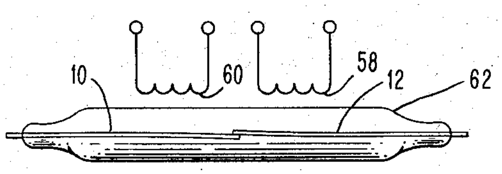
FIGURE 6 is a view illustrating a modified form of the memory device shown in FIGURE 5.

FIGURE 6, illustrates the elements housed in a heremetically sealed pod 62 of glass or other suitable material, with the outer ends of the members 10 and 12 extending from the ends of the pod for connection to suitable circuitry. In this form of the invention, the magnetic coil actuators 58 and 60 are best arranged on the outside of the pod in positions to exert their magnetic forces to change the condition of the memory device, as described above in connection with FIGURE 5.

Figure 7:
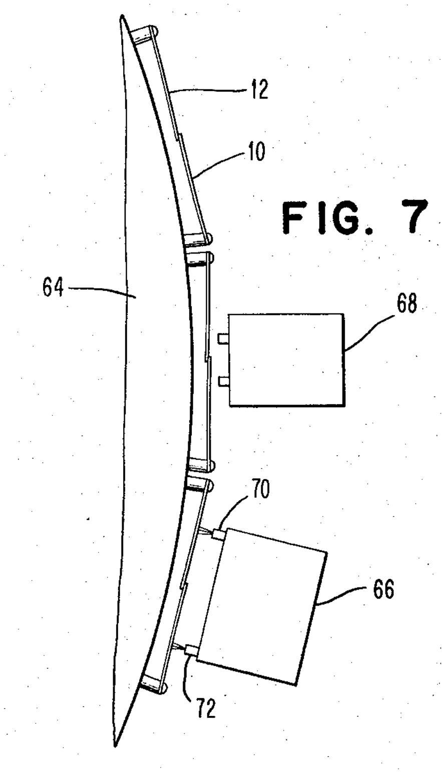
FIGURE 7 is a fragmentary view showing a plurality of the memory devices mounted on and arranged in rows and columns around the periphery of a drum.

As seen in FIGURE 7, a plurality of the memory devices are mounted on and arranged around the periphery of a rotatable drum 64 in axial rows and circumferential columns, it being understood that only one of the memory devices for each of three axial rows is shown. The drum is arranged to be rotated relative to a row of read and write heads 66 and 68, one for each memory device in a row, whereby the condition of the memory devices may be "set" or "re-set," as described above. For example, at the beginning of a memory cycle, all of the heads 68 can be energized to move all of the devices to their "re-set" condition, and then be operated selectively to actuate certain of them to their "set" condition, in accordance with the information to be stored. Read out of this information at read station 66, just below the write station, may be obtained merely by probing the ends of the members 10 and 12 with probes 70 and 72. Suitable circuitry connected to the probes would indicate the conditions of the devices, or effect operation of associate equipment, such as a punch. The memory devices may be arranged on the drum in any pattern, but preferably with the same number and arrangement as there are punch positions on a punched card.

Figure 8:
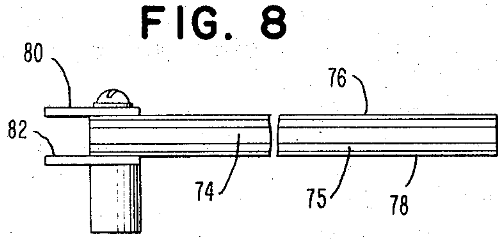
FIGURE 8 is an enlarged elevational view, partially broken away, of a modified form of the flexible members of the device whereby it may be used as an electrical flip-flop.

In the modification illustrated in FIGURE 8, each of the memory members comprise a basic flexible member 74 of a suitable material having a conductive coating on each of its opposite faces 76 and 78, suitably insulated from member 74 by electrically nonconductive material 75. The coatings are in electrically conductive relationship with contacts 80 and 82 whereby they may be connected with suitable electric circuitry, such as shown in FIGURE 1, for indicating and detecting the condition of the memory device. In this form of the invention it will be understood, of course, that regardless of which of the members is on top of the other, both conditions will be conductive, and each may be connected in a different circuit. In this form of the invention the device is similar to an electrical flip-flop memory.

Figure 10:
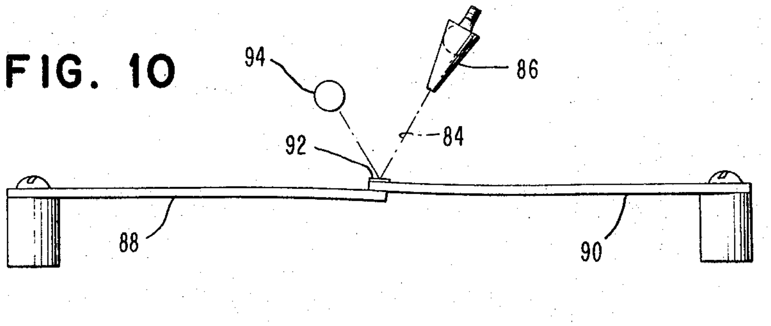
FIGURE 10 is an elevational view of the invention showing optical scanning means.

Photo-electrical means, as seen in FIGURE 10, may be used for determining the condition of the memory. A beam of light 84 is projected from the light source 86 against the overlapping ends of the spring members 88 and 90. A reflecting spot 92 is provided on the end of the member 90 to reflect the beam 84 to a photo-cell 94 when the memory is in one condition. When in the other condition, the beam is absorbed or diffused so that insufficient light is reflected to activate the photo-cell, Suitable means (not shown) for indicating either condition may be connected to and be actuated by the photo-cell.

Figure 9:
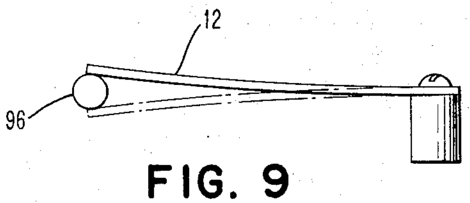
FIGURE 9 is an elevational view of still another modification of the invention.

If desired the uninsulated spring member 10 may be replaced by a fixed member, such as the rod 96, shown in FIGURE 9. In this form, the member 12 is flexed to opposite sides of the rod to establish the "set" and "reset" conditions of the device. Alternatively, one of the "flat springs" may be a rigid flat strip.

The embodiments of the invention in which an exclusive property or privilege is claimed are defined as follows:

1. A memory device comprising:
(A) a base structure;
(B) a first member flexible throughout its length attached to said base structure and having a free end extending therefrom with opposite first and second surfaces orthogonal to the direction of flexure;
(C) a second member flexible throughout its length attached to said base structure spaced from said first member and having a free end extending toward said first member with opposite first and second surfaces orthogonal to the direction of flexure, one of said surfaces at the free end of said second member slidably engaging and at least partially overlapping one of the surfaces at the free end of said first member whereby movement of each of said members is impeded in one direction;
(D) displacement means flexing at least one of said members at a position along its length which causes its free end to slide clear of the free end and to snap to the other side of the other member placing the opposite surfaces of said first and second members in positive slidable partially overlapping engagement with each other; and
(E) means detecting the relative positions of said members.

2. A device according to claim 1 wherein said last means comprises:
(A) a reflective spot at the overlapping end of one of said flexible members; and
(B) photo-electric means detecting the position of said spot.

3. A memory device comprising:
(A) a base structure;
(B) a first electrically conductive member flexible throughout its length attached to said base structure and having a free end extending therefrom with opposite first and second surfaces orthogonal to the direction of flexure, at least an end portion of one of said surfaces being electrically non-conductive;
(C) a second electrically conductive member, flexible throughout its length attached to said base structure spaced from said first member and having a free end extending toward said first member with opposite first and second surfaces orthogonal to the direction of flexure, one of said surfaces at the free end of said second member slidably engaging and at least partially overlapping the electrically non-conductive surface at the free end of said first member whereby said members are in electrically non-conductive relation to each other and movement of each said members is impeded in one direction;
(D) displacement means flexing at least one of said members at a position along its length which causes its free end to slide clear of the free end and to snap to the other side of the other member placing the opposite surfaces of said first and second members in positive slidable partially overlapping engagement with each other; and
(E) electrical means indicating the relative positions of said members.

4. A memory device according to claim 3 wherein said displacement means includes:
(A) means for returning said members to their electrically nonconductive condition relative to each other.

5. A memory device according to claim 4 wherein said displacement means comprises:

(A) means for directing a stream of fluid against said members selectively and of sufficient power so to move said members relative to each other.

6. A memory device according to claim 4 wherein said displacement means comprises:

(A) at least two solenoids.

7. A memory device according to claim 4 wherein said displacement means comprises:

(A) at least two manually operable keys.

8. A memory device according to claim 4 wherein said displacement means comprises:

(A) electro-magnetic means.

9. A memory device according to claim 8 and further including:

(A) a housing enclosing said members.

10. A memory device according to claim 9 wherein said housing comprises:

(A) a hermetically sealed pod.

11. A memory device according to claim 4 and further comprising:

(A) a plurality of said memory devices arranged in a matrix of rows and columns; and (B) a plurality of said electrical indicating means, one for each memory device in a row.

12. A memory device according to claim 11 and further including:

(A) a rotatable drum upon which said memory devices are mounted on the peripheral outer surface for moving said rows of memory devices successively past and in operative relation with said row of electrical indicating means.

13. A memory device comprising:

(A) a base structure;

(B) a first elongated flat electrically conductive member flexible throughout its length attached to said base structure and having a free end extending therefrom with opposite first and second surfaces orthogonal to the direction of flexure, one of said surfaces being electrically non-conductive;

(C) a second elongated flat electrically conductive member flexible throughout its length attached to said base structure and having a free end extending toward said first member with opposite first and second surfaces orthogonal to the direction of flexure, one of said surfaces at the free end of said second member slidably engaging and at least partially overlapping the electrically non-conductive surface at the free end of said first member whereby movement of each of said members is impeded in one direction and said members are electrically insulated from each other by said electrically non-conductive surface;

(D) displacement means flexing at least one of said members at a position along its length which causes its free end to slide clear of the free end and to snap to the other side of the other member placing the opposite surfaces of said first and second members in positive slidable partially overlapping electrically conductive engagement with each other; and (E) electrical means attached to said members indicating their relative positions.

14. A device comprising:

(A) a base member;

(B) a first member flexible throughout its length attached to said base member and having a free end extending therefrom with opposite first and second surfaces orthogonal to the direction of flexure;

(C) a second member flexible throughout its length having opposite first and second surfaces, either one of said surfaces of said second member slidably engaging and at least partially overlapping either one of said opposite surfaces of said free end of said flexible member and impeding movement of the free end in one direction;

(D) displacement means flexing said first flexible member in said one direction to foreshorten said first projected length of the flexible member along the straight line connecting its ends until the freen end snaps clear the second member to positively engage the latter; and (E) means sensing the relative position of the free end of the flexible member with respect to said second member.

15. A device according to claim 14 wherein:

(A) said flexible members are electrically conductive; and wherein, (B) one of the said surfaces of one of said first and second members is electrically non-conductive; whereby (C) in one relative position the members are electrically conductive one to the other; and (D) in the other relative position they are electrically non-conductive one to the other.

16. A device according to claim 14 wherein:

(A) said first flexible member includes electrically conductive coatings on its opposite surfaces and insulated therefrom; and wherein (B) said sensing means comprises electrical circuit means connectable to said conductive coatings and said second member indicating the relative positions of said members.

17. A flip-flop device comprising:

(A) a base member;

(B) a first member flexible throughout its length attached to said base member and having a free end extending therefrom with opposite first and second surfaces orthogonal to the direction of flexure, said flexible member including electrically conductive coatings on its opposite surfaces but each being insulated from one another;

(C) a second conductive member flexible throughout its length having opposite first and second surfaces and having a free end extending therefrom, one of said surfaces of said second member slidably engaging and at least partially overlapping one of said opposite conductive surface at said free end of said first flexible member and impeding movement of said second flexible free end in one direction;

(D) displacement means flexing one of said flexible members at a position along its length which causes its free end to slide clear of the other free end and to snap to the other side of said flexible member placing said second conductive member and the electrically conductive coating in overlapping engagement with one another;

(E) electrical power means connected to said second flexible member;

(F) a first electrical load connected between said first conductive layer and said electrical power means and a second electrical load connected between said second conductive layer and said electrical power means;

(G) whereby when second flexible member is juxtaposed to said first conductive coating, current flows through said first load in a first direction and when said second flexible member is juxtaposed to said second conductive coating, current flows through said second load in a second direction.

References Cited

UNITED STATES PATENTS

| | | | |
|---|---|---|---|
| 2,751,462 | 6/1956 | Markowitz | 200—113 |
| 3,294,927 | 12/1966 | Hill | 200—5 |

ROBERT K. SCHAEFER, *Primary Examiner.*

H. O. JONES, *Examiner.*